(12) United States Patent
Park

(10) Patent No.: US 9,730,008 B2
(45) Date of Patent: Aug. 8, 2017

(54) METHOD FOR GUIDING LOCATION, MACHINE-READABLE SAVING MEDIUM, AND MOBILE COMMUNICATION TERMINAL

(75) Inventor: Chan-Ho Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 219 days.

(21) Appl. No.: 13/995,057

(22) PCT Filed: Dec. 15, 2011

(86) PCT No.: PCT/KR2011/009682
§ 371 (c)(1),
(2), (4) Date: Jun. 17, 2013

(87) PCT Pub. No.: WO2012/081919
PCT Pub. Date: Jun. 21, 2012

(65) Prior Publication Data
US 2013/0273940 A1    Oct. 17, 2013

(30) Foreign Application Priority Data

Dec. 15, 2010  (KR) ........................ 10-2010-0128133

(51) Int. Cl.
*H04W 4/02*       (2009.01)
*G01C 21/20*     (2006.01)
(Continued)

(52) U.S. Cl.
CPC .............. *H04W 4/02* (2013.01); *G01C 21/20* (2013.01); *G01C 21/3438* (2013.01);
(Continued)

(58) Field of Classification Search
CPC ..... H04M 2242/30; H04M 2203/6009; H04M 2250/10; H04M 3/42348; G08G 1/0968;
(Continued)

(56) References Cited

U.S. PATENT DOCUMENTS 6,321,158 B1 * 11/2001 DeLorme et al. ............ 701/426
8,160,812 B1 *  4/2012 Ng ..................... G01C 21/3682
                                                                340/995.1
(Continued)

FOREIGN PATENT DOCUMENTS

| KR | 1020070112910 | 11/2007 |
| KR | 1020080029036 | 4/2008 |
| KR | 1020090058117 | 6/2009 |

OTHER PUBLICATIONS

PCT/ISA/237 Written Opinion issued on PCT/KR2011/009682 (pp. 4).
PCT/ISA/210 Search Report issued on PCT/KR2011/009682 (pp. 3).

*Primary Examiner* — Thai Vu
(74) *Attorney, Agent, or Firm* — The Farrell Law Firm, P.C.

(57) ABSTRACT

A method for guiding location includes commencing a call between a first terminal and a second terminal, the first terminal requesting the collection of location information from the second terminal, receiving the location information of the second terminal and displaying on the first terminal a geographic information map displaying the location information, and the user of the first terminal transmitting to the second terminal direction information that is displayed on the geographic information map. As a result, more intuitive and convenient location guidance is provided.

16 Claims, 4 Drawing Sheets

(51) Int. Cl.
*G01C 21/34* (2006.01)
*G01C 21/36* (2006.01)
*H04W 4/04* (2009.01)
*H04L 29/08* (2006.01)
*H04W 4/20* (2009.01)
*H04W 4/16* (2009.01)

(52) U.S. Cl.
CPC ............ *G01C 21/362* (2013.01); *H04L 67/18* (2013.01); *H04W 4/043* (2013.01); *H04W 4/026* (2013.01); *H04W 4/027* (2013.01); *H04W 4/16* (2013.01); *H04W 4/20* (2013.01)

(58) Field of Classification Search
CPC ........... G08G 1/096805; G08G 1/0911; G08G 1/0969; G08G 1/202; H04W 4/02; H04W 4/026; H04W 4/027; H04W 4/043; H04W 4/16; H04W 4/20; G01C 21/20; G01C 21/3438; G01C 21/362

USPC ......... 455/456.1, 456.2, 456.3, 456.4, 456.5, 455/456.6, 457
See application file for complete search history.

(56) References Cited

U.S. PATENT DOCUMENTS

| | | |
|---|---|---|
| 2004/0192335 A1* | 9/2004 | Wong .................... H04W 64/00 455/456.1 |
| 2004/0203879 A1* | 10/2004 | Gardner et al. ........... 455/456.1 |
| 2009/0005018 A1 | 1/2009 | Forstall et al. |
| 2009/0141118 A1 | 6/2009 | Chun |
| 2009/0181699 A1 | 7/2009 | Tysowski |
| 2009/0186629 A1* | 7/2009 | Soelberg et al. .......... 455/456.1 |
| 2009/0325603 A1 | 12/2009 | Van Os et al. |
| 2010/0029302 A1 | 2/2010 | Lee et al. |

* cited by examiner

METHOD FOR GUIDING LOCATION, MACHINE-READABLE SAVING MEDIUM, AND MOBILE COMMUNICATION TERMINAL

PRIORITY

This application claims priority under 35 U.S.C §119(a) to Korean Application Serial No. 10-2010-0128133, which was filed in the Korean Intellectual Property Office on Dec. 15, 2010, the contents of which are incorporated herein by reference.

BACKGROUND OF THE INVENTION

1. Field of the Invention

The present invention relates generally to a method of guiding a position, and more particularly, to a method of guiding a position using portable terminals such as a mobile phone, a Personal Data Assistant (PDA), a laptop computer, and a tablet Personal Computer (PC).

2. Description of the Related Art

Mobile devices have become user necessities. As the communication technologies of mobile devices have evolved, the mobile devices now support additional functions such as digital camera, multimedia recording/reproducing, Digital Multimedia Broadcasting (DMB), financial settlement, Internet search, electronic notebook, and wireless data communication functions.

In addition, the support of a navigation function in such devices using a Global Positioning System (GPS) has become commonplace, and myriad navigation programs have been developed and installed in such mobile devices as smart phones.

However, a navigation device is generally restricted to operate only for "roads" on the Road Traffic Act, and thus does not provide pedestrian guidance. Further, while the navigation device is useful for information seekers, a more intuitive guiding method is needed for visually impaired, aged, or special needs persons in comparison with other persons. In addition, a method of intuitively acquiring assistance from another person by using a smart phone when receiving position-guiding is needed.

SUMMARY OF THE INVENTION

The present invention has been made to solve the above-mentioned problems and provides a more intuitive position-guiding method using a mobile phone.

In accordance with an aspect of the present invention, a method of guiding a position includes initiating phone communication between a first terminal and a second terminal, requesting position information from the second terminal, by the first terminal, receiving the position information of the second terminal and displaying a geographic information map including the position information in the first terminal, and transmitting guiding information included in the geographic information map to the second terminal, by the first terminal.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF EMBODIMENTS OF THE INVENTION

Hereinafter, embodiments of the present invention will be described with reference to the accompanying drawings. In the following description, a detailed description of known functions and configurations incorporated herein will be omitted for the sake of clarity and conciseness. Certain definitions found in the following description are provided only to help general understanding of the present invention, and it is apparent to those skilled in the art that the present invention can be implemented without such definitions. Therefore, the definitions thereof should be made based on the contents reflecting the entire description of the present specification.

While terms including ordinal numbers, such as "first" and "second," etc., may be used to describe various components, such components are not limited by the above terms. The above terms are used only to distinguish one component from another. For example, a first component may be referred to as a second component without departing from the scope of the present invention, and likewise a second component may be referred to as a first component. The term of and/or encompasses a combination of plural items or any one of the plural items.

When a component is referred to as being "connected" or "accessed" to other component, it should be understood that not only is the component directly connected or accessed to the other component, but also, another component may exist therebetween. When a component is referred to as being "directly connected" or "directly accessed" to other component, it should be understood that there is no component therebetween.

Figure 1:
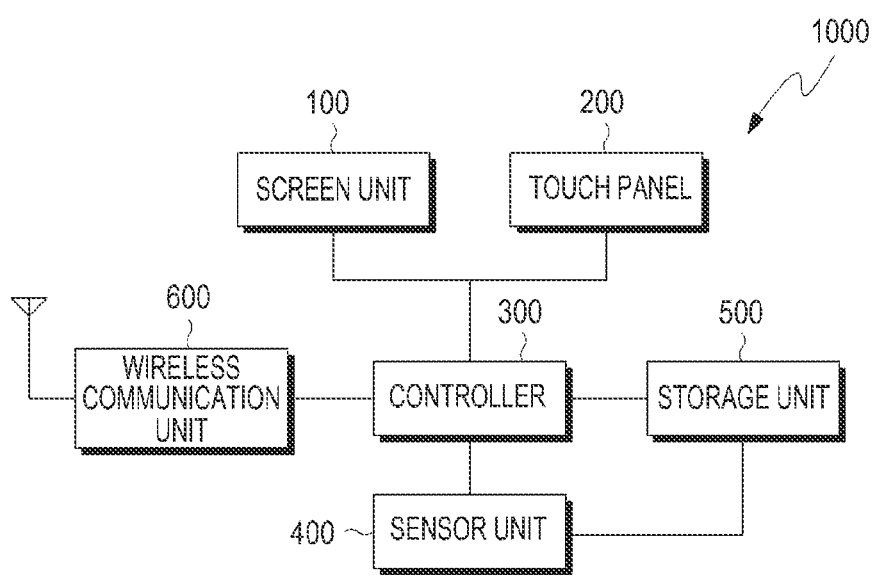
FIG. 1 illustrates a terminal according to an embodiment of the present invention.

FIG. 1 illustrates a terminal according to an embodiment of the present invention. Referring to FIG. 1, a terminal 1000 includes a screen unit 100, a touch panel 200, a controller 300, a sensor unit 400, a storage unit 500, and a wireless communication unit 600.

The screen unit 100 displays an image and includes one of a Plasma Display Panel (PDP), a Liquid Crystal Display (LCD), an Organic Light Emitting Diode (OLED), and a Cathode Ray Tube (CRT).

The touch panel 200 is disposed on the screen unit 100. When a user touches various menu screens displayed on the screen unit 100, a particular command can be performed. The touch panel 200 is implemented in any type such as a resistive type, a capacitive type, a ultrasonic type, an infrared ray type, an optical type, or a bending wave type. The touch panel 200 is disposed on a front surface of the terminal 1000, and the screen unit 100 is disposed below the touch panel 200. A user interface displayed by the screen unit 100 is shown to the user through the transparent touch panel 200.

The controller 300 controls general operations of the terminal 1000 as a central processing unit, and the terminal 1000 serves to perform a position- guiding method.

The sensor unit 400 is a sensor for detecting a position, a direction, and a motion of the terminal 1000 and includes at least one of an acceleration sensor, a gravity sensor, an impact sensor, a Global Positioning System (GPS) sensor, and a compass sensor.

The storage unit 500 stores such information as a geographic information map, an operating system of the terminal 1000, various applications, information input to the terminal 1000, and information generated within the terminal 1000.

The wireless communication unit 600 wirelessly transmits data from the controller 300 or receives a wireless signal.

Figure 2:
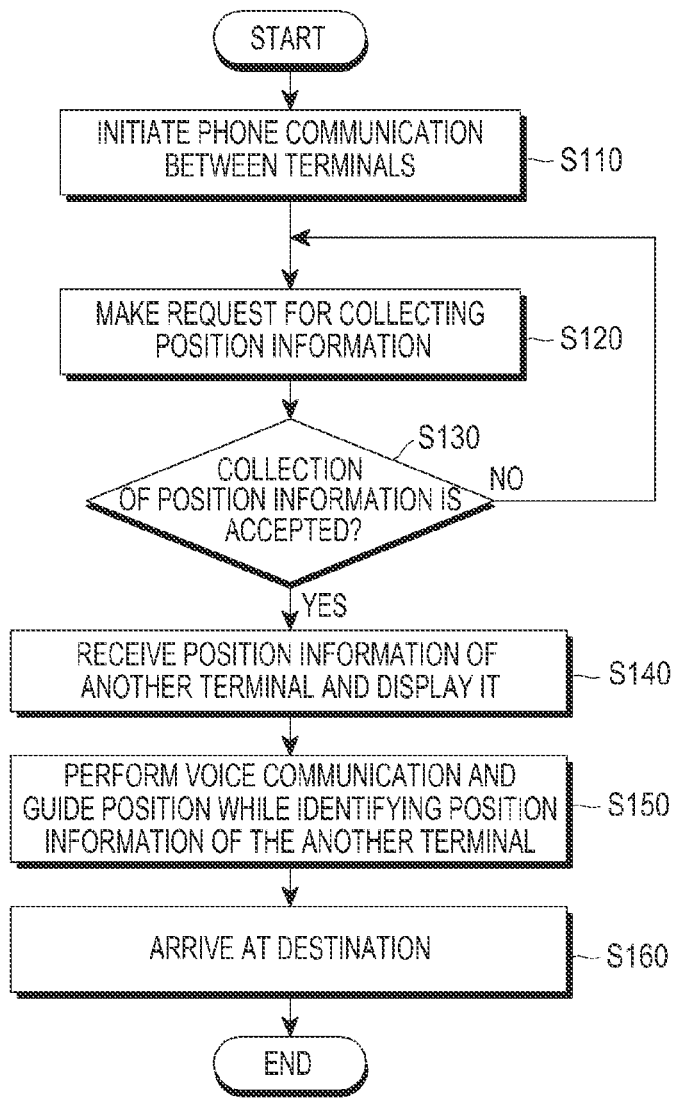
FIG. 2 illustrates a position-guiding method according to a first embodiment of the present invention.

FIG. 2 illustrates a position-guiding method according to an embodiment of the present invention.

In step S110, phone communication between a first terminal and a second terminal is initiated. Transmission of a call message to initiate the phone communication is performed by one of the first and second terminals, and each of the first and second terminals may have the configuration as shown in FIG. 1.

In step S120, the first terminal requests position information from the second terminal The request for collecting the position information is manually performed by a user of the first terminal or automatically performed through a prearranged setting of the user, a currently executed phone communication application, or a default setting by a separate guiding application.

In step S130, the second terminal or a user of the second terminal determines whether to accept the collection of the position information according to the request for collecting the position information. In a case of the acceptance, the second terminal performs a step S140, In a case of the rejection, the second terminal repeatedly performs step S120 or ends the position- guiding method and informs the user of the first terminal that the collection of the position information has failed.

In step S140, the first terminal receives position information of the second terminal according to the acceptance of the collection of the position information and displays the received position information for the user of the first terminal, In step S150, the user of the first terminal identifies the transmitted position information of the second terminal, transmits guiding information for a destination to the second terminal, and communicates with the user of the second terminal. In steps S140 and S150, the collection of the position information and the transmission of the guiding information is performed aperiodically (for example, when the guiding information is input), in real time, or repeatedly.

In step S160, when the user of the second terminal arrives at the destination, the collection of the position information and the transmission of the guiding information end. The ending of the collection and transmission is achieved, for example, by a request of the user, such as a command for ending the guiding application.

According to the method, it is possible to guide the position while both the terminals identify the position information, Specifically, in step S140, the position information of the second terminal is displayed in real time in the first terminal. Since the position information is shared in real time, the guiding is possible and an error margin of the guiding can be minimized. The same position information of the second terminal may be displayed in the first terminal. Even though geographic information maps used by the first terminal and the second terminal are different, the first terminal loads the same coordinate value to the geographic information map to display a current position of the user of the second. terminal, so that the same position information is displayed. The first terminal can transmit its own position information to the second terminal, and current positions of the first and second terminals are simultaneously displayed on one of the geographic information maps.

Moreover, the first and second terminals receive the geographic information map from a server to share the same geographic information. map. In addition, the first terminal having received the position information of the second terminal may transmit the geographic information map including the current position of the second terminal (and the first terminal) and guiding information to the second terminal.

In step S110, when the phone communication is initiated, a position information-collecting menu is activated and displayed in the screen unit of the first terminal. In step S120, when the user of the first terminal selects the position information-collecting menu by using the touch panel or the like, the first terminal transmits a position information collection request message to the second terminal according to a request of the user, In step S130, a request menu screen for requesting for accepting the collection of the position information is generated in the screen unit of the second terminal. When the user of the second terminal selects an acceptance menu from the request menu screen, the second terminal transmits a position information collection acceptance message to the first terminal according to a request of the user. The request menu screen may display an "acceptance" menu and a "rejection" menu, which prevents personal information from being sent without permission of the user.

When the user of the second terminal selects the "acceptance" menu, a GPS sensor of the second terminal is turned on and collects the position information of the user of the second terminal. The turning on of the UPS sensor prevents the OPS sensor from being driven full-time, and thus optimizes power consumption. Each of steps S120 and S130 may be automatically performed by a prearranged setting of the user of the terminal or a default setting by a currently executed application.

When the acceptance of the position information is completed, the current position of the user of the first terminal is displayed in the first terminal or the second terminal, and preferably in the screen units of both terminals. Accordingly, the user of the first terminal can guide a movement position of the user of the second terminal while viewing the screen unit. In this case, the user of the first terminal can guide the movement position by voice While performing phone communication.

The aforementioned geographic information map is also displayed on the screen units of the first terminal and the second terminal. Accordingly, the user of the first terminal can share the position information of the user of the second terminal through the map.

Figure 3:
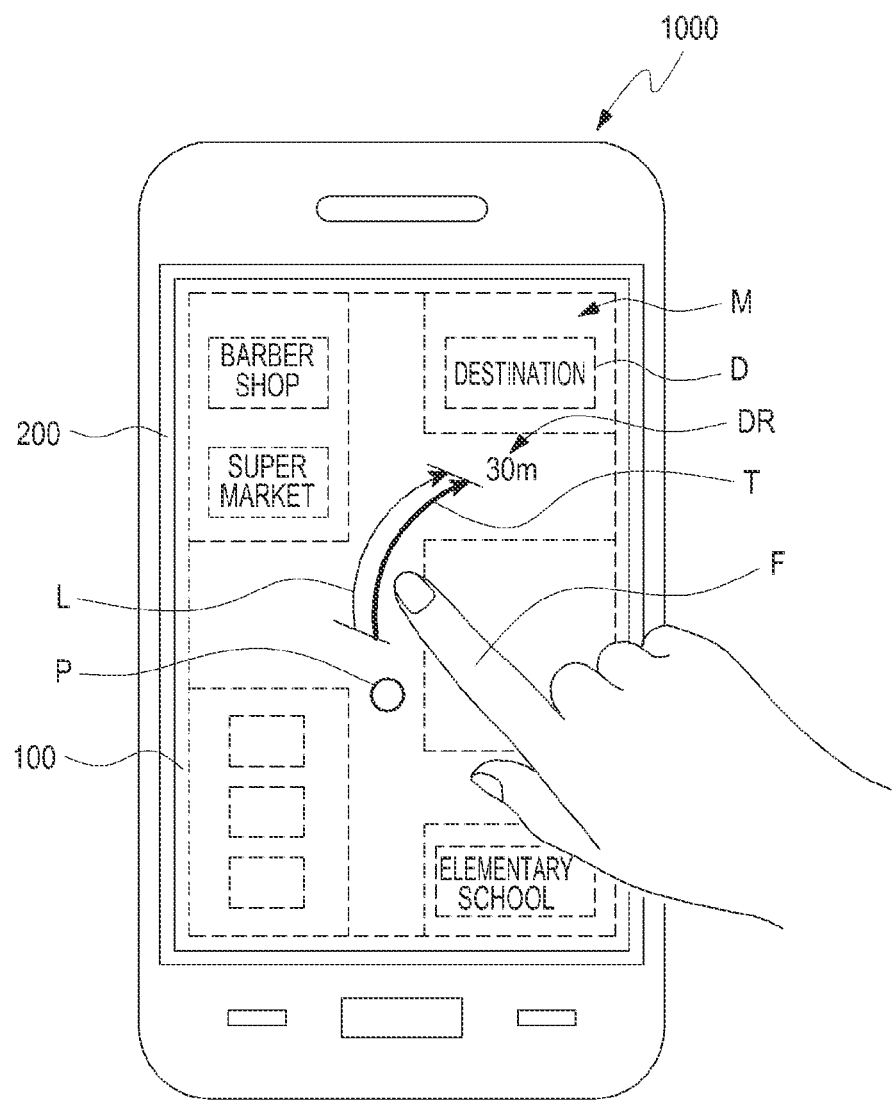
FIG. 3 illustrates a position-guiding method according to an embodiment of the present invention.

FIG. 3 illustrates a position-guiding method according to another embodiment of the present invention, and will describe only matters different from the previous embodiment. FIG. 3 schematically illustrates that the first terminal 1000 including the touch panel 200 disposed on the screen unit is controlled by the user of the first terminal, and more specifically, by a finger F of the user.

As illustrated in FIG. 3, a current position P of the user of the second terminal is displayed on the screen unit 100. A destination D is displayed in an upper right side of the current position P. described above, the screen unit 100 may further display the current position of the user of the first terminal, and the destination D is, for example, the current position of the user of the first terminal.

Accordingly, the user of the first terminal can touch the touch panel 200 in a direction indicated by a reference numeral T on a geographic information map M by using the finger F. Such a touch input may be switched to direction data (that is, guiding information), transmitted to the second terminal, and then displayed on the screen unit of the second terminal as a figure including an arrow in the same direction. The transmission of the data is performed through the wireless communication unit 600. Since the touch input may be performed in a front direction, a rear direction, a right direction, and a left direction, the input can be made in all directions. Accordingly, the user of the second terminal visually receives the guiding of the direction in which the user will move.

When the user of the first terminal performs the touch input, the touch input is made to form a certain length. That is, as illustrated in FIG. 3, the user of the first terminal can make the input to form a length L while maintaining the touch with the touch panel 200 in performing the touch input. The geographic information map M includes scale information, so that the length L is converted to actual distance information through an operation by the controller. Accordingly, distance information (DR) is displayed on the screen unit of the second terminal in detail.

Although the distance information DR is displayed on the screen unit 100 of the first terminal 1000 in FIG. 3, the user of the second terminal only has to receive the guiding according to the distance information and the distance information may not be displayed in the first terminal.

As described above, since the direction actually touched by the person who performs the guiding is transmitted to the person who receives the guiding together with actual distance information, a more intuitive guiding is enabled.

Figure 4:
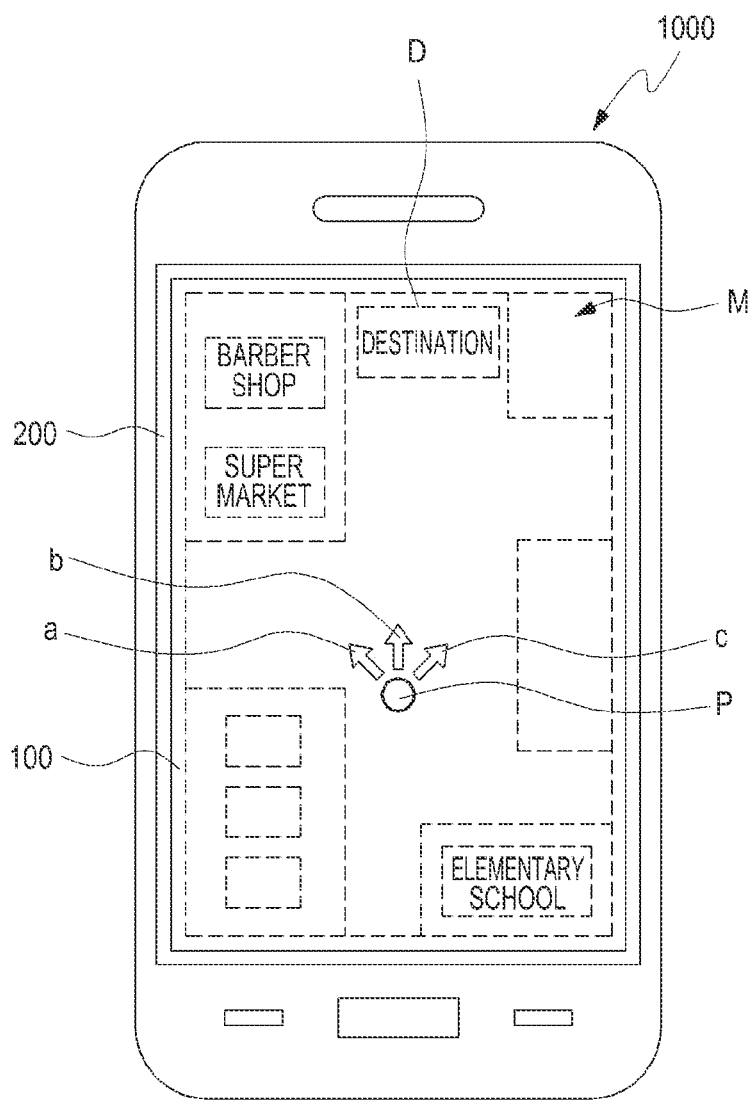
FIG. 4 illustrates a position-guiding method according to an embodiment of the present invention.

FIG. 4 illustrates a position-guiding method according to another embodiment of the present invention, and will describe only matters different from the previous embodiments. In FIG. 4, the user of the first terminal identifies a forward facing direction of the user of the second terminal.

The sensor unit of the terminal may further include a compass sensor. Since the compass sensor determines due north, due south, due east, and due west directions, when the terminal is located approximately facing the user, the terminal can determine the forward facing direction of the user.

That is, when the user of the second terminal faces forward in an a, b, or c direction, the user of the first terminal also can visually identify the a, b, or c direction as illustrated in FIG. 4. For example, when a facing direction of the user of the second terminal is "a", the user of the first terminal can guide the user of the second terminal to rotate by 45 degrees in a right direction. When the facing direction of the user of the second terminal is "c", the user of the first terminal can guide the user of the second terminal to arrive at the destination D by rotating by 45 degrees in a left direction and then going straight.

Although the present invention has been described with reference to certain embodiments, the present invention is not limited thereto. The present invention can be modified and implemented in various forms without departing from the scope of the claims, detailed descriptions, and accompanying drawings and the modification and implementation are included in the scope of the present invention.

It is appreciated that the embodiments of the present invention can be implemented in software, hardware, or a combination thereof. Any such software may be stored, for example, in a volatile or non-volatile storage device such as a Read Only Memory (ROM), a memory such as a Random Access Memory (RAM), a memory chip, a memory device, or a memory Integrated Chip (IC), or a recordable optical or magnetic medium such as a Compact Disc (CD), a Digital Video Disc (DVD), a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

While the present invention has been shown and described with reference to certain embodiments thereof, it will be understood by those skilled in the art that various changes in form and details may be made therein without departing from the spirit and scope of the present invention as defined by the appended claims.

The invention claimed is:

1. A method of guiding a position, the method comprising:
   initiating phone communication between a first terminal and a second terminal;
   requesting, by the first terminal, position information from the second terminal;
   receiving, by the first terminal, the position information of the second terminal and displaying, by the first terminal, a geographic information map and the position information; and
   transmitting, by the first terminal, guiding information to the second terminal,
   wherein the position information of the second terminal includes information on a current position of a user of the second terminal and information on a direction in which the user of the second terminal currently faces from the current position, and the guiding information includes information on a direction in which the user of the second terminal will face from the current position, and
   wherein the guiding information further includes information on a rotation angle with respect to the direction in which the user of the second terminal currently faces from the current position.

2. The method of claim 1, wherein the position information of the second terminal is displayed in the first terminal in real time.

3. The method of claim 2, wherein the position information is identically displayed in both the first terminal and the second terminal.

4. The method of claim 1, further comprising activating a position information-collecting menu in a screen unit of the first terminal, when the phone communication is initiated.

5. The method of claim 1, further comprising:
   receiving, on a touch panel of the first terminal, a touch input of a user in a direction on the geographic information map; and
   switching the touch input to the guiding information.

6. The method of claim 5, wherein the guiding information includes distance information in proportion to a length during which the touch input is maintained when the user of the first terminal performs the touch input.

7. A second terminal for guiding a position, the second terminal comprising:
 a screen unit;
 a wireless communication unit;
 a controller configured for:
 initiating phone communication between a first terminal and the second terminal through the wireless communication unit;
 receiving a request for collecting position information of the second terminal from the first terminal through the wireless communication unit;
 displaying, on the screen unit, a request menu screen that includes an acceptance menu and a rejection menu;
 when the acceptance menu is selected, turning on a Global Positioning System (GPS) sensor of the second terminal which collects the position information of the second terminal;
 transmitting the position information of the second terminal to the first terminal through the wireless communication unit;
 receiving guiding information from the first terminal through the wireless communication unit; and
 displaying, on the screen unit, a geographic information map and the guiding information,
 wherein the position information of the second terminal includes information on a current position of a user of the second terminal and information on a direction in which the user of the second terminal currently faces from the current position, and the guiding information includes information on a direction in which the user of the second terminal will face from the current position, and
 wherein the guiding information further includes information on a rotation angle with respect to the direction in which the user of the second terminal currently faces from the current position.

8. The second terminal of claim 7, wherein the guiding information is displayed in real time on the screen unit.

9. The second terminal of claim 7, wherein the guiding information includes distance information, and the distance information is converted to an actual distance according to scale information of the geographic information map and displayed on the screen unit of the second terminal.

10. A non-transitory machine-readable storage medium having recorded thereon a program for executing a method of guiding a position, the method comprising:
 initiating phone communication between a first terminal and a second terminal;
 requesting, by the first terminal, position information from the second terminal;
 receiving, by the first terminal, the position information of the second terminal and displaying, by the first terminal, the position information on a geographic information map; and
 transmitting, by the first terminal, guiding information to the second terminal,
 wherein the position information of the second terminal includes information on a current position of a user of the second terminal and information on a direction in which the user of the second terminal currently faces from the current position, and the guiding information includes information on a direction in which the user of the second terminal will face from the current position, and
 wherein the guiding information further includes information on a rotation angle with respect to the direction in which the user of the second terminal currently faces from the current position.

11. A first terminal for guiding a position, comprising:
 a screen unit;
 a wireless communication unit; and
 a controller configured for:
 initiating phone communication between the first terminal and a second terminal through the wireless communication unit,
 requesting collection of position information to the second terminal, by the first terminal through the wireless communication unit,
 receiving the position information of the second terminal through the wireless communication unit,
 displaying, on the screen unit, a geographic information map and the position information, and
 transmitting guiding information to the second terminal through the wireless communication unit,
 wherein the position information of the second terminal includes information on a current position of a user of the second terminal and information on a direction in which the user of the second terminal currently faces from the current position, and the guiding information includes information on a direction in which the user of the second terminal will face from the current position, and
 wherein the guiding information further includes information on a rotation angle with respect to the direction in which the user of the second terminal currently faces from the current position.

12. The first terminal of claim 11, wherein the position information of the second terminal is displayed on the screen unit of the first terminal in real time.

13. The first terminal of claim 12, wherein the position information is identically displayed in both the first terminal and the second terminal.

14. The first terminal of claim 11, wherein the controller is configured for displaying a position information collecting menu on the screen unit of the first terminal, when the phone communication is initiated.

15. The first terminal of claim 11, wherein the controller is configured for:
 receiving, on a touch panel of the first terminal, a touch input of a user in a direction on the geographic information map; and
 switching the touch input to the guiding information.

16. The first terminal of claim 15, wherein the guiding information includes distance information in proportion to a length during which the touch input is maintained when the user of the first terminal performs the touch input.

* * * * *